(12) United States Patent
Naitou

(10) Patent No.: US 11,331,810 B2
(45) Date of Patent: May 17, 2022

(54) DEVICE, METHOD AND PROGRAM FOR ESTIMATING WEIGHT AND POSITION OF GRAVITY CENTER OF LOAD BY USING ROBOT

(71) Applicant: FANUC CORPORATION, Yamanashi (JP)

(72) Inventor: Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 144 days.

(21) Appl. No.: 16/817,607

(22) Filed: Mar. 13, 2020

(65) Prior Publication Data

US 2020/0298417 A1 Sep. 24, 2020

(30) Foreign Application Priority Data

Mar. 20, 2019 (JP) .............................. JP2019-053086

(51) Int. Cl.
*B25J 13/08* (2006.01)
*B25J 9/16* (2006.01)
(52) U.S. Cl.
CPC ........... *B25J 13/085* (2013.01); *B25J 9/1612* (2013.01); *B25J 13/082* (2013.01)
(58) Field of Classification Search
CPC ...... B25J 13/085; B25J 9/1612; B25J 13/082; B25J 9/1638; B25J 9/1653; B25J 19/0095; G05B 2219/40599; G05B 2219/39504; G05B 2219/37537; G05B 2219/35124; G01G 19/52; G01M 1/122

USPC .................................................. 700/245–264
See application file for complete search history.

(56) References Cited

U.S. PATENT DOCUMENTS

| | | | | |
|---|---|---|---|---|
| 4,741,567 A * | 5/1988 | Zimmer | ................... | B25J 15/02 271/92 |
| 4,916,636 A * | 4/1990 | Torii | .................... | G05B 19/416 700/245 |
| 5,103,404 A * | 4/1992 | McIntosh | ................ | A63B 24/00 318/568.22 |
| 5,709,219 A * | 1/1998 | Chen | ........................ | A63F 13/06 600/595 |
| 8,423,188 B2 * | 4/2013 | Tsusaka | ................. | G05B 19/42 700/253 |
| 8,606,398 B2 * | 12/2013 | Eakins | .................... | B25J 9/1687 700/245 |

(Continued)

FOREIGN PATENT DOCUMENTS

JP S6334609 A 2/1988
JP H2-300644 A 12/1990
(Continued)

*Primary Examiner* — Jaime Figueroa
(74) *Attorney, Agent, or Firm* — Hauptman Ham, LLP

(57) ABSTRACT

A device, a method and a program, by which a weight and a horizontal position of a gravity center of a load attached to a movable part of a robot can be estimated by a simple configuration. The device has: two torque sensors configured to detect a first torque applied to a first axis of a robot, and a second torque applied to a second axis of the robot; and a calculation section configured to calculate a weight and a horizontal position of a gravity center of a workpiece, by using two detection values of the torque sensors in one posture in which a hand attached to a movable part of the robot holds the workpiece.

11 Claims, 2 Drawing Sheets

(56) References Cited

U.S. PATENT DOCUMENTS

| | | | | |
|---|---|---|---|---|
| 8,775,129 B2* | 7/2014 | Sato | ........................ | G01L 5/009 |
| | | | | 702/199 |
| 8,798,793 B2* | 8/2014 | Lim | ....................... | B25J 9/1638 |
| | | | | 700/253 |
| 9,114,524 B2* | 8/2015 | Yoo | ........................ | B25J 9/0006 |
| 9,399,293 B2* | 7/2016 | Shin | ....................... | B25J 9/1638 |
| 2005/0029331 A1* | 2/2005 | Kano | ................... | B23K 20/123 |
| | | | | 228/112.1 |
| 2005/0199600 A1* | 9/2005 | Ruthven | ................ | B23K 9/028 |
| | | | | 219/125.1 |
| 2009/0043425 A1* | 2/2009 | Ito | ........................ | B25J 9/1671 |
| | | | | 700/256 |
| 2011/0015785 A1* | 1/2011 | Tsusaka | ................. | B25J 9/0003 |
| | | | | 700/254 |
| 2011/0040407 A1* | 2/2011 | Lim | ....................... | B25J 9/1638 |
| | | | | 700/253 |
| 2011/0211938 A1* | 9/2011 | Eakins | ................. | B25J 15/0019 |
| | | | | 414/738 |
| 2012/0004775 A1* | 1/2012 | Andoh | ................... | B25J 9/1643 |
| | | | | 700/259 |
| 2012/0209430 A1* | 8/2012 | Igarashi | ................. | B25J 9/1697 |
| | | | | 700/259 |
| 2013/0173060 A1* | 7/2013 | Yoo | ........................ | B25J 9/0006 |
| | | | | 700/261 |
| 2014/0188277 A1* | 7/2014 | Lee | ....................... | B25J 15/0052 |
| | | | | 700/258 |
| 2015/0290799 A1* | 10/2015 | Iwatake | ................ | G01L 5/0028 |
| | | | | 700/257 |
| 2015/0314445 A1* | 11/2015 | Naitou | ................... | B25J 9/1674 |
| | | | | 700/258 |
| 2015/0323398 A1* | 11/2015 | Lauzier | ................. | B25J 9/0081 |
| | | | | 73/862.08 |
| 2016/0016311 A1* | 1/2016 | Konolige | ............. | B25J 15/0616 |
| | | | | 700/245 |
| 2016/0176052 A1* | 6/2016 | Yamamoto | ............. | B25J 9/1676 |
| | | | | 700/255 |
| 2016/0178430 A1* | 6/2016 | Holcomb | ................ | G01G 23/10 |
| | | | | 29/407.08 |
| 2016/0305842 A1* | 10/2016 | Vulcano | .................... | B25J 11/00 |
| 2019/0283249 A1* | 9/2019 | Komoda | ................ | B25J 9/1612 |
| 2019/0283251 A1* | 9/2019 | Nakamoto | ............. | B25J 9/1638 |
| 2020/0143127 A1* | 5/2020 | Wagner | ............... | G06K 7/10693 |
| 2020/0282565 A1* | 9/2020 | Nakamoto | ............. | B25J 9/0093 |

FOREIGN PATENT DOCUMENTS

| | | |
|---|---|---|
| JP | H3-55189 A | 3/1991 |
| JP | H3-142179 A | 6/1991 |
| JP | H9-91004 A | 4/1997 |
| JP | 200849459 A | 3/2008 |
| JP | 2011235374 A | 11/2011 |
| JP | 201418931 A | 2/2014 |
| JP | 2016129912 A | 7/2016 |
| JP | 2016147340 A | 8/2016 |
| JP | 201761025 A | 3/2017 |
| JP | 201777608 A | 4/2017 |
| JP | 201812193 A | 1/2018 |
| JP | 201865232 A | 4/2018 |

* cited by examiner

U.S. 11,331,810 B2

DEVICE, METHOD AND PROGRAM FOR ESTIMATING WEIGHT AND POSITION OF GRAVITY CENTER OF LOAD BY USING ROBOT

RELATED APPLICATIONS

The present application claims priority to Japanese Application Number 2019-053086, filed Mar. 20, 2019, the disclosure of which is hereby incorporated by reference herein in its entirety.

BACKGROUND OF THE INVENTION

1. Field of the Invention

The present invention relates to a device, a method and a program for estimating a weight and a position of a gravity center of a load, by using a robot.

2. Description of the Related Art

Generally, an article (or load) is attached to a front end of a movable part (e.g., a robot arm) of a robot, and it is important to know or acquire a weight and a position of a gravity center of the load, in order to control the robot with high accuracy.

As a relevant prior art, a device or method for estimating the weight or the position of the gravity center of an article attached to a robot arm is well known, wherein the torque of a rotation axis of the robot arm to which the article is attached is used (e.g., see JP H03-142179 A, JP H09-091004 A and JP H02-300644 A).

Further, a method for performing a force control of a robot is well known, wherein a tool is attached to a front end of a robot arm via a force sensor, and a force from an object including the tool and a workpiece is detected (e.g., see JP H03-055189 A).

In the conventional method for estimating the weight or the position of the gravity center of the article by calculation, it is necessary to move the robot so as to represent a plurality of postures, and measure a torque applied to an axis of the robot at each posture. However, it takes a time to operate the robot for the above measurement.

In particular, when a robot is used as a conveying device in a material flow system, etc., the weight and/or the position of the gravity center may differ between workpieces to be conveyed in many cases, and thus the estimation of the weight and/or the position of the gravity center of the workpiece must be performed every when the robot holds each workpiece. In such a case, a conveying time of the workpiece is extended when the robot is operated so as to represent a plurality of postures.

SUMMARY OF THE INVENTION

One aspect of the present disclosure is an estimation device comprising: at least one sensor configured to detect a first torque applied to a first portion of a robot, and a second torque applied to a second portion of the robot different from the first portion or a force applied to the robot; and a calculation section configured to calculate a weight of an article and a horizontal position of the article, by using a detection value of the sensor in one posture in which the robot holds the article positioned at a movable part of the robot.

Another aspect of the present disclosure is an estimation method comprising the steps of: providing at least one sensor to a robot, the sensor being configured to detect a first torque applied to a first portion of the robot, and a second torque applied to a second portion of the robot different from the first portion or a force applied to the robot; attaching an article to a movable part of the robot; and calculating a weight of the article and a horizontal position of the article, by using a detection value of the sensor in one posture in which the robot holds the article positioned at the movable part of the robot.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

First Embodiment

Figure 1:
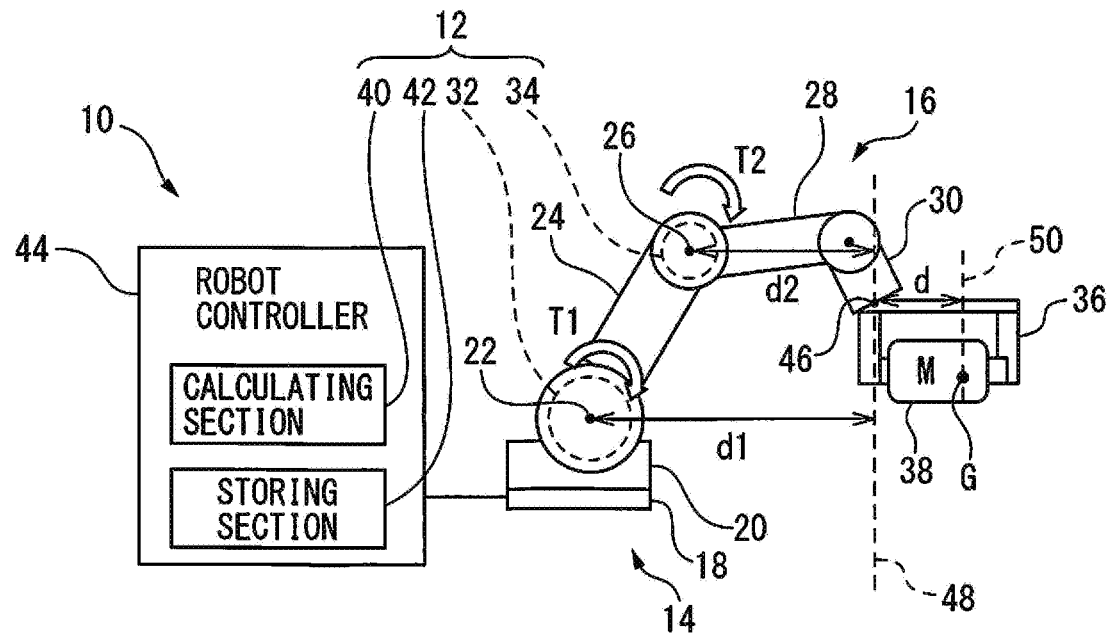
FIG. 1 shows an example of a configuration of an estimation device according to a first embodiment.

FIG. 1 shows an example of a schematic configuration of a robot system 10 including a robot 14 and an estimation device 12 according to a preferred embodiment. Robot 14 may have any structure as long as movable part 16 can perform a motion as explained below. In the drawing, robot 14 is an industrial multi-joint robot having six axes, including: a base part 18 located at a predetermined position; a rotating body 20 rotatably attached to base part 18 about a generally vertical axis; an upper arm 24 rotatably attached to rotating body 20 about a first axis 22; a forearm 28 rotatably attached to upper arm 24 about a second axis 26; and a wrist part 30 rotatably attached to forearm 28.

Estimation device 12 includes: at least one sensor (in the example of FIG. 1, two torque sensors 32 and 34) configured to detect a first torque applied to a first portion (in this case, first axis 22) of robot 14, and a second torque applied to a second portion (in this case, second axis 26) of robot 14 different from the first portion or a force applied to robot (as explained below); and a calculation section 40 configured to calculate a weight M of an article (workpiece) 38 and a horizontal position of a gravity center G of workpiece 38, by using detection values of sensors 32 and 34 in one posture in which a hand 36 attached to a movable part 16 (in this case, wrist part 30 corresponding to a front end of the movable part) of robot 14 holds or grips workpiece 38 (i.e., the weight of the workpiece acts on the robot only). In addition, estimation device 12 may have a storing section 42 such as a memory, configured to store data used by calculating section 40 and/or a calculation result thereof, etc.

As an example of the article, the weight and the horizontal position of the gravity center of which are to be estimated, an object (or workpiece) 38 to be conveyed, held by hand 36 attached to the front end (in this case, wrist part 30) of movable part 16, may be used. However, the object to be estimated is not limited as such, for example, workpiece 38 and hand 36 may be treated as substantially one article, or hand 36 may be treated as the object to be estimated when hand 36 does not hold workpiece 38. Otherwise, when an end effector (e.g., a tool, a welding torch or a laser head, etc.) which does not hold the workpiece is attached to wrist part 30, the end effector may be treated as the object to be estimated. Herein, the article to be estimated may also be referred to as a load.

After the weight and the horizontal position of the gravity center of the load are estimated by a process as explained below, robot 14 can perform a predetermined operation such as conveying or machining of the workpiece with high accuracy, by using estimated values, without detaching the load from robot 14.

Calculating section 40 has a function for calculating weight M and the position of gravity center G of workpiece 38. In the drawing, calculation section 40 may be incorporated, as an arithmetic processing unit such as a processor, in a robot controller 44 configured to control the motion of robot 14, by using the estimated weight and the position of the gravity center. Alternatively, a calculator (not shown) such as a personal computer (PC), separated from robot controller 44, may have the function of calculation section 40. In this case, it is preferable that robot controller 44 and the calculator such as the PC be communicably connected to each other by wire or by radio, so that robot controller 44 can control robot 14 by using the estimated wright and the position of the gravity center. In addition, the estimation device may have a suitable input section (not shown) such as a keyboard or a touch panel, so that the operator can configure various settings.

The components such as calculation section 40 of estimation device 12 may be realized as software for operating a processor such as a CPU (central processing unit) of a computer. Alternatively, the components may be realized as hardware such as a processor and/or a memory configured to at least partially execute the process of the software.

Next, a method (procedure) for estimating the weight and the horizontal position of the gravity center of the article (in this case, workpiece 38) by using estimation device 12 will be explained. First, as shown in FIG. 1, when (movable part 16 of) robot 14 holding workpiece 38 represents a (one) posture, a torque (first torque T1) applied to first axis 22 is detected by first torque sensor 32, and a torque (second torque T2) applied to second axis 26 is detected by second torque sensor 34. The torques may be detected when movable art 16 of robot 14 is stopped, or when movable part 16 is moved (as long as first torque T1 and second torque T2 are constant).

At this time, with respect to weight M of the workpiece and a first torque T1' applied to first axis 22 due to weight M, following equation (1) is true. Similarly, with respect to weight M of the workpiece and a second torque T2' applied to second axis 26 due to weight M, following equation (2) is true. In equations (1) and (2), d1 is a horizontal distance between first axis 22 and a vertical line 48 which passes through a tip position 46 of movable part 16 (in this case, a front end of wrist part 30 such as a tool center point) in a state of FIG. 1 (or the posture of robot 14 in FIG. 1), d2 is a horizontal distance between second axis 26 and vertical line 48, and d3 is a horizontal distance between vertical line 48 and a vertical line 50 which passes through the position of gravity center G of workpiece 38.

$$T1'=(d1+d)\times M \qquad (1)$$

$$T2'=(d2+d)\times M \qquad (2)$$

In this regard, first torque T1' can be obtained by calculating section 40, etc., by subtracting a torque T1 relating to a weight of a component (in this case, each part such as an arm and a hand constituting movable part 16) of robot 14 from first torque T1 detected by torque sensor 32. The torque relating to the component of robot 14 can be obtained by a calculation (e.g., a Newton-Euler method) using the mass and the position of the gravity center of the component.

Alternatively, first torque T1' may be calculated by subtracting a value of torque sensor 32 measured when robot 14 does not hold workpiece 38 while representing the same posture as in FIG. 1 from first torque T1. Otherwise, when torque sensor 32 is configured to measure a load torque of a motor (e.g., a servomotor) for driving the first axis, first torque T1' may be calculated by subtracting a torque due to movable part 16 of robot 14 and a torque due to friction, etc., from first torque T1. Similarly, second torque T2' can be calculated by using second torque T2 measured by torque sensor 34.

On the other hand, horizontal distances d1 and d2 from each torque sensor (or the center of each drive axis) to tip position 46 of the robot can be calculated from a dimension (e.g., a length of a link) of robot 14 and an angular position of each axis. Therefore, by solving equations (1) and (2) as simultaneous equations, weight M and horizontal position d of gravity center G (concretely, a distance in the horizontal direction from tip position 46 of wrist part 30 to gravity center G) of the workpiece can be obtained.

As described above, in the first embodiment, the two torque values, detected when robot 14 represents one posture while holding workpiece 38, are used. Therefore, it is not necessary to operate the robot so as to perform a particular motion, e.g., in which movable part 16 represents another posture, in order to estimate the weight and the position of the gravity center of workpiece 38. In the first embodiment, a vertical position of the gravity center of workpiece 38 cannot be specified. However, when robot 14 grips workpiece 38 at a predetermined transport origin and conveys workpiece 38 to a predetermined transport destination without changing the posture of workpiece 38, the vertical position (in the direction of gravity) of gravity center G is not necessary to control robot 14. As such, when the posture of the load is not changed, the weight and the horizontal position of the gravity center of the workpiece are sufficient information for properly controlling the robot.

In the embodiment of FIG. 1, the drive axis of upper arm 24 (first axis 22) and the drive axis of forearm 28 (second axis 26) are used as the objects, the torques of which are to be detected, the present disclosure is not limited as such. For example, a drive axis of wrist part 30 (not shown) may be used instead of first axis 22 or second axis 26. In any case, it is necessary to control robot 14 so that values d1 and d2 in equations (1) and (2) are different from each other.

Figure 2:
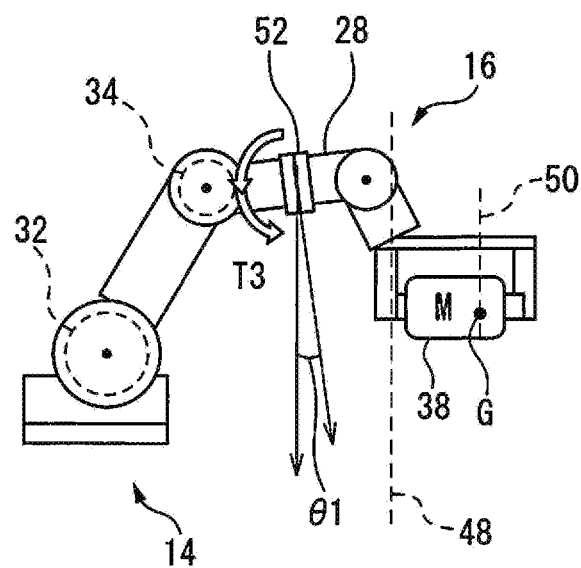
FIG. 2 exemplifies a state in which a torque sensor is added to the configuration of FIG. 1.

FIG. 2 shows an example of a configuration for obtaining the horizontal distance from robot tip position 46 to gravity center G of workpiece 38, with respect to the direction perpendicular to a paper surface. Herein, as the torque sensor for detecting a torque applied to an axis perpendicular to first axis 22 or second axis 26, a torque sensor 52 configured to detect a torque about a longitudinal axis of forearm 28 is provided to forearm 28, and a detection value of torque sensor 52 is referred to as T3. In this case, a torque T3' in the direction of gravity is represented by following equation (3), wherein θ1 is an angle formed by a surface perpendicular to the longitudinal axis and the direction of gravity. Note that the longitudinal axis of forearm 28 does not coincide with the vertical direction. By calculating T3', the horizontal position of gravity center G of workpiece 38 with respect to the direction perpendicular to the paper surface can be calculated, according to the arithmetic processing as described above. Therefore, in the example of FIG. 2, even when the posture of the load may be changed, as long as the load only rotates along the horizontal surface (about the vertical axis), the position of the gravity center of the load can be easily calculated from a rotational angle, etc., thereof. For example, in case that the horizontal distance from tip position 46 to gravity center G with respect to the direction perpendicular to the paper surface is referred to as d', when workpiece 38 is rotated about the vertical axis, the gravity center G merely perform a rotational movement, a radius of rotation of which is $((d^2+d'^2)^{1/2})$. Therefore, the above calculation is easy.

$$T3'=T3/\cos\theta1 \quad (3)$$

Second Embodiment

Figure 3:
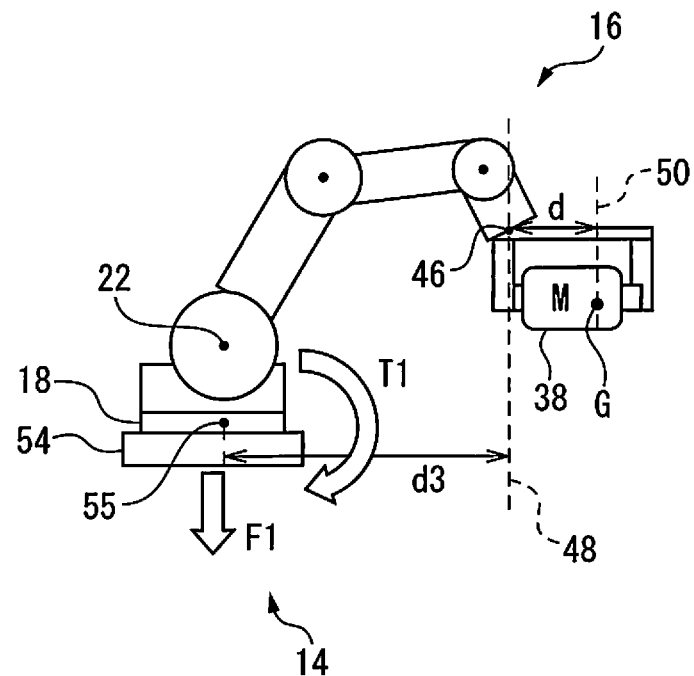
FIG. 3 shows an example of a configuration of an estimation device according to a second embodiment.

FIG. 3 shows an example of a configuration of an estimation device according to a second embodiment. Herein, a detailed explanation of components in the second embodiment, which may be the same as in the first embodiment, will be omitted.

In the example of FIG. 3, instead of two torque sensors 32, 34 in the first embodiment, a six-axis force sensor 54 provided to robot 14 (in the drawing, a lower side of base 18) is used. First, when (movable part 16 of) robot 14 holding workpiece 38 represents a (one) posture, a torque (first torque T1) applied to a first portion of robot 14 (in this case, base 18 including a detection point 55 of sensor 54) is detected by six-axis force sensor 54, and a force F1 applied to robot 14 is also detected by six-axis force sensor 54.

At this time, with respect to weight M of the workpiece and a first torque T1' applied to base 18 of robot 14 due to weight M, following equation (4) is true. Further, a force F1' applied to robot 14 due to weight M is equal to weight M (equation (5)). In this regard, F1' is a value obtained by subtracting a force relating to the weight of the component of robot 14 from a force value detected by six-axis force sensor 54 or a force sensor 56 as described below. Note that, in equation (4), d3 is a horizontal distance between base 18 (detection point 55) and vertical line 48 which passes through tip position 46 of movable part 16 in a state of FIG. 3 (or the posture of robot 14 in FIG. 3), and d is a horizontal distance between vertical line 48 and vertical line 50 which passes through the position of gravity center G of workpiece 38.

$$T1'=(d3+d)\times M \quad (4)$$

$$M=F1' \quad (5)$$

In this regard, first torque T1' can be obtained by calculating section 40, etc., by subtracting a (calculated) torque relating to a weight of a component (in this case, an arm and a hand, etc., of movable part 16) of robot 14 from first torque T1 about detecting point 55 detected by six-axis force sensor 54. Alternatively, first torque T1' may be calculated by subtracting a value of six-axis force sensor 54 measured when robot 14 does not hold workpiece 38 while representing the same posture as in FIG. 3 from first torque T1.

On the other hand, horizontal distance d3 from six-axis force sensor 54 (or detecting point 55) to tip position 46 of the robot can be calculated from a dimension (e.g., a length of a link) of robot 14 and an angular position of each axis. Therefore, by solving equations (4) and (5), weight M and horizontal position of gravity center G (concretely, distance d in the horizontal direction from tip position 46 of wrist part 30 to gravity center G) of the workpiece can be obtained.

Figure 4:
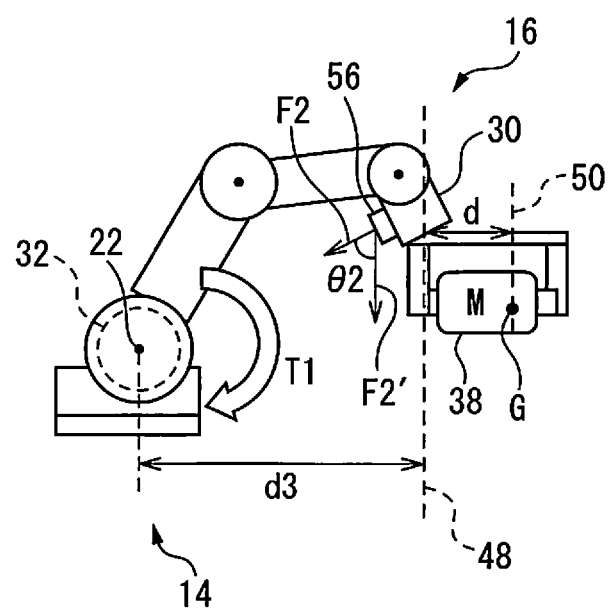
FIG. 4 shows another example of the configuration of the estimation device according to the second embodiment.

FIG. 4 shows another example of the configuration of the estimation device according to the second embodiment. In the example of FIG. 4, instead of torque sensor 34 in the first embodiment, a force sensor 56 provided to robot (in the drawing, wrist part 30) is used. First, when (movable part 16 of) robot 14 holding workpiece 38 represents a (one) posture, a torque (first torque T1) applied to first axis 22 is detected by torque sensor 32, and a force F2 applied to robot 14 is detected by force sensor 56.

At this time, with respect to weight M of the workpiece and a first torque T1' applied to first axis 22 due to weight M, equation (4) as described above is true. Further, with respect to weight M of the workpiece and a force F2' applied to the robot due to weight M, following equation (6) is true. Note that F2' is represented by following equation (7), wherein θ2 is an angle formed by a direction of force F2 detected by force sensor 56 and the direction of gravity.

$$M=F2' \quad (6)$$

$$F2'=F2/\cos\theta2 \quad (7)$$

On the other hand, horizontal distance d3 from the center of first axis 22 to tip position 46 of the robot can be calculated from a dimension (e.g., a length of a link) of robot 14 and an angular position of each axis. Therefore, by solving equations (4), (6) and (7), weight M and horizontal position of gravity center G (concretely, distance d in the horizontal direction from tip position 46 of wrist part 30 to gravity center G) of the workpiece can be obtained.

As described above, in the second embodiment, one torque value and one force value, detected when robot 14 represents one posture while holding workpiece 38, are used. Therefore, similarly to the first embodiment, it is not necessary to operate the robot so as to perform a particular motion, e.g., in which movable part 16 represents another posture, in order to estimate the weight and the position of the gravity center of workpiece 38. Therefore, similarly to the first embodiment, the weight and the horizontal position of the gravity center of the load can be used as sufficient information for properly controlling the robot, in an application wherein the posture of the load is not changed. In addition, when the six-axis force sensor is used, one detected torque value and one detected force value as described above can be obtained, only by providing substantially one sensor to robot 14.

Also, in the second embodiment, by using torque sensor 52, etc., as described above, the horizontal distance from tip position 46 of the robot to gravity center G of workpiece 38, with respect to the direction perpendicular to the paper surface, can be obtained.

As described in the present disclosure, in particular when a function for detecting a contact between the robot having a means for detecting a torque (e.g., a torque sensor) and an external object should be realized, it is required that the weight and the position of the gravity center of the load be estimated with high accuracy. For example, an external force applied to the robot can be detected by subtracting the torque and inertia torque due to the weight of the robot and the torque and inertia torque due to the load positioned at the front end of the movable part from the torque value detected by the torque sensor. However, a difference between the weight and the position of the gravity center of the load which are set or stored in the robot controller, etc., and an actual weight and an actual position of the gravity center of the load may become an error of the detected torque of the outer force, whereby an accuracy of the detection of the contact may be deteriorated. Such as a robot capable of detecting a contact may be used as a collaborative robot which shares a working area with a human, and thus it is necessary to increase an accuracy of the detection of contact. According to the present disclosure, merely by performing measurement and arithmetic processing at one posture, the weight and the horizontal position of the gravity center of the load with a practically sufficient accuracy.

As the torque sensor in the present disclosure, various types of torque sensors (e.g., a non-contact (magnetostrictive) type or a contact type (slip ring) sensor) may be used, as long as the torque sensor can detect (measure) the torque applied to the specific axis. In the present disclosure, the "torque applied to an axis" detected by the torque sensor (i.e., a detected torque value) corresponds to a value obtained by subtracting an influence value of friction, etc., from a torque of a motor for driving each axis of the robot, or to a sum of the obtained value and an influence value of the gravity. Therefore, by using the torque sensor, the weight and the position of gravity center of the article can be estimated with (at least practically) a high degree of accuracy, without estimating or identifying the friction, since such estimation or identification of the friction is considered to be difficult.

As the force sensor in the present disclosure, various types of force sensors (e.g., a strain-gauge type or an electrostatic capacitance type sensor) may be used, and the force sensor may be configured to measure a force in only one direction. The force sensor may be attached to the upper arm or the forearm of the robot, as well as the wrist part of the robot. Further, the force sensor may be attached to a portion where the torque sensor is not attached.

In the present disclosure, the storage section of the estimation device or another storage unit may store a program, by which the above process is executed by the robot or an arithmetic processing unit such as the estimation device, which is used in conjunction with the robot. Also, the program may be provided as a non-transitory computer readable medium (e.g., a CD-ROM or a USB memory) configured to store the program.

According to the present disclosure, the weight and the horizontal position of the gravity center of the load can be estimated with a practically sufficient accuracy, by the measurement in one posture in which the robot holds the load.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. An estimation device, comprising:
at least one sensor configured to detect a first torque applied to a first portion of a robot, and a second torque applied to a second portion of the robot different from the first portion or a force applied to the robot; and
a processor configured to calculate a weight of an article and a position of a gravity center of the article with respect to the robot in a horizontal direction, by using a detection value of the at least one sensor in one posture in which the robot holds the article positioned at a movable part of the robot.

2. The estimation device of claim 1, wherein the at least one sensor comprises two torque sensors configured to respectively detect the first torque and the second torque.

3. The estimation device of claim 2, wherein the processor is configured to calculate the weight and the position of the gravity center of the article with respect to the robot in the horizontal direction, by using two torque values obtained by subtracting a torque relating to a weight of a component of the robot from the first and second torques respectively detected by the two torque sensors.

4. The estimation device of claim 1, wherein the at least one sensor comprises a six-axis force sensor provided to the robot.

5. The estimation device of claim 1, wherein the at least one sensor comprises a torque sensor configured to detect the first torque and a force sensor provided to the robot.

6. The estimation device of claim 4, wherein the processor is configured to calculate the weight and the position of the gravity center of the article with respect to the robot in the horizontal direction, by using:
a first value obtained by subtracting a torque relating to a weight of a component of the robot from the first torque detected by the six-axis force sensor, and
a second value obtained by subtracting a force relating to the weight of the component of the robot from a force value detected by the six-axis force sensor.

7. The estimation device of claim 5, wherein the processor is configured to calculate the weight and the position of the gravity center of the article with respect to the robot in the horizontal direction, by using:
a first value obtained by subtracting a torque relating to a weight of a component of the robot from the first torque detected by the torque sensor, and
a second value obtained by subtracting a force relating to the weight of the component of the robot from a force value detected by the force sensor.

8. An estimation method, comprising:
detecting, by at least one sensor, a first torque applied to a first portion of a robot, and a second torque applied to a second portion of the robot different from the first portion or a force applied to the robot; and
calculating a weight of an article and a position of a gravity center of the article with respect to the robot in a horizontal direction, by using a detection value of the at least one sensor in one posture in which the robot holds the article positioned at the movable part of the robot.

9. The estimation method of claim 8, wherein said calculating the weight and the position of the gravity center of the article with respect to the robot in the horizontal direction comprises using two torque values obtained by subtracting a torque relating to a weight of a component of the robot from the first and second torques.

10. The estimation method of claim 8, wherein said calculating the weight and the position of the gravity center of the article with respect to the robot in the horizontal direction comprises using:
a first value obtained by subtracting a torque relating to a weight of a component of the robot from the first torque, and
a second value obtained by subtracting a force relating to the weight of the component of the robot from a force value detected by the at least one sensor.

11. A non-transitory computer readable medium storing a program for causing, when executed by a robot and an arithmetic processing unit used in conjunction with the robot, execution of:
detecting, by at least one sensor, a first torque applied to a first portion of the robot, and a second torque applied to a second portion of the robot different from the first portion or a force applied to the robot; and calculating, by the arithmetic processing unit, a weight of an article and a position of a gravity center of the article with respect to the robot in a horizontal direction, by using a detection value of the at least one sensor in one posture in which the robot holds the article positioned at the movable part of the robot.

\* \* \* \* \*